Aug. 29, 1961 A. W. DUNHAM ET AL 2,997,942
BALING APPARATUS
Filed April 26, 1957 5 Sheets-Sheet 2
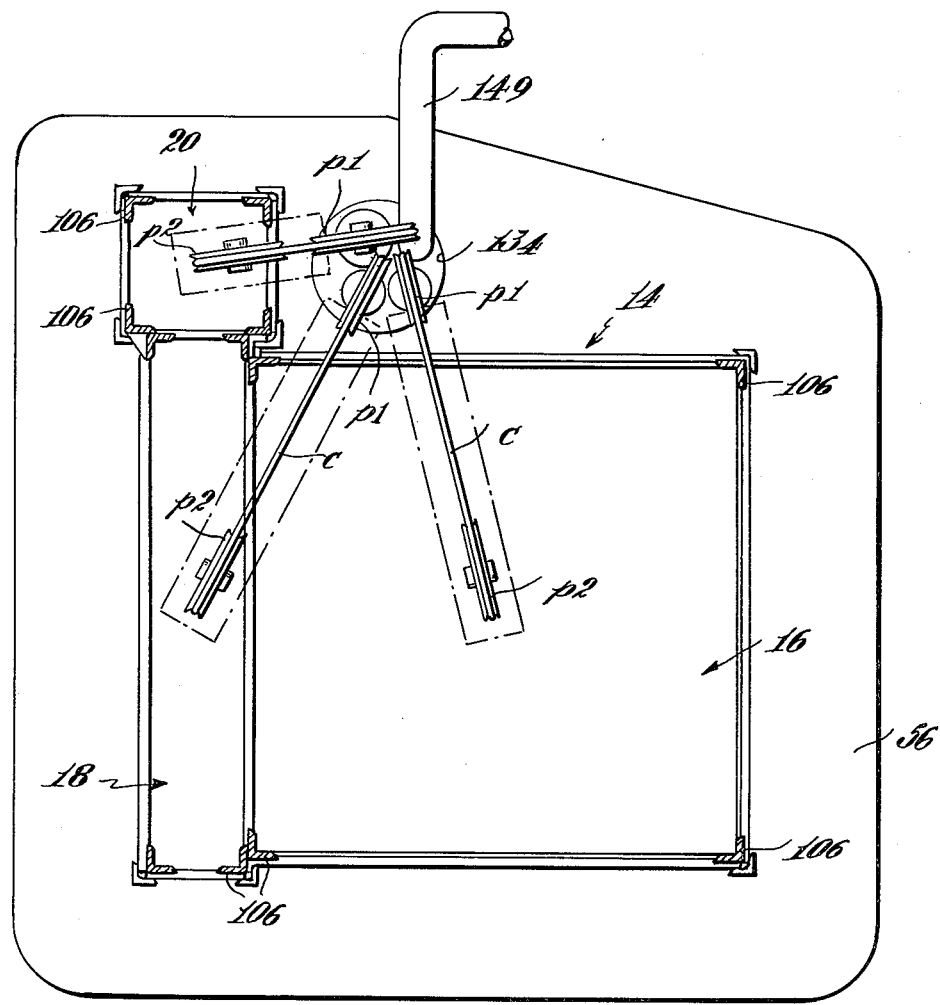
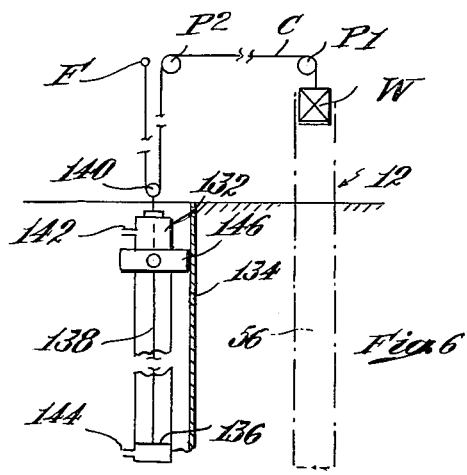
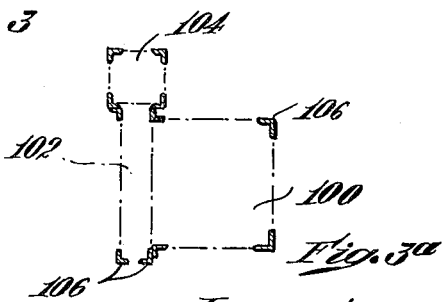
Inventors
Ansel W. Dunham
Philip N. Dunham
by Roberts, Cushman & Grover
Attorneys

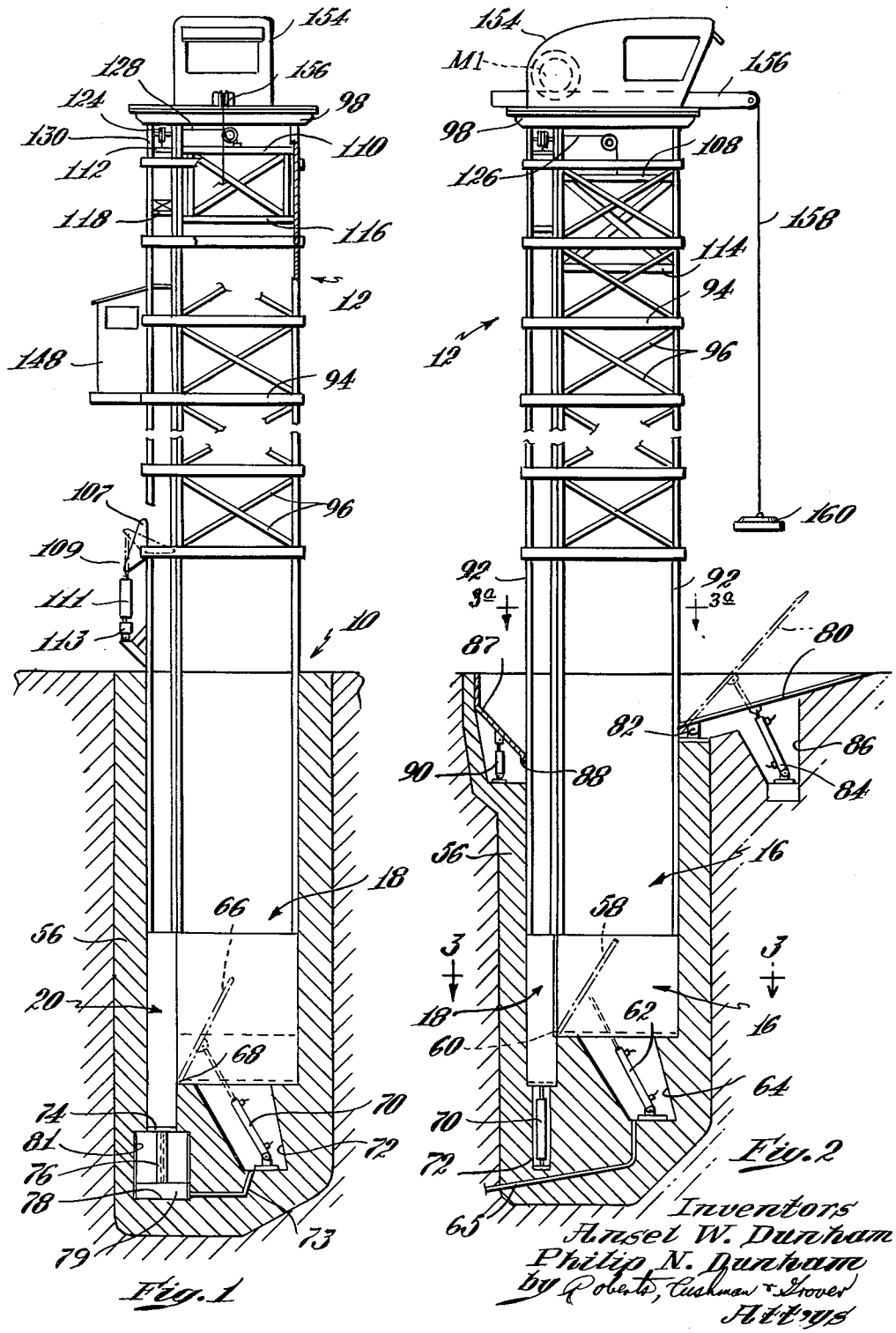

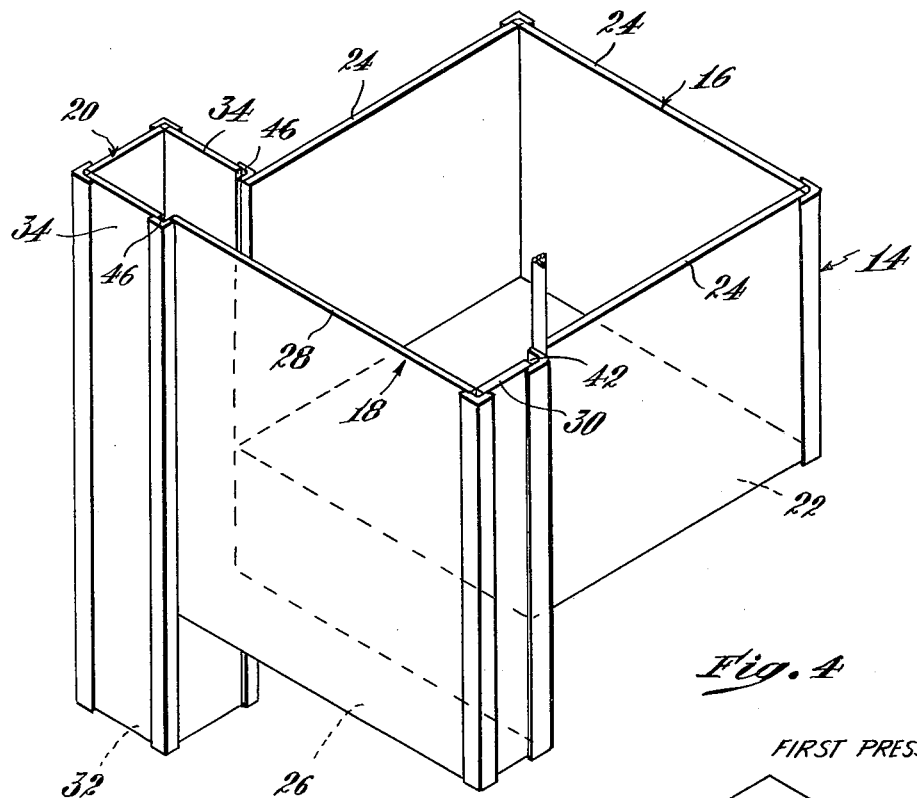
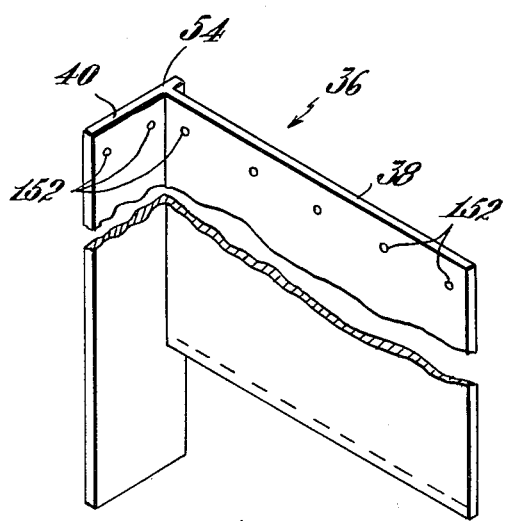
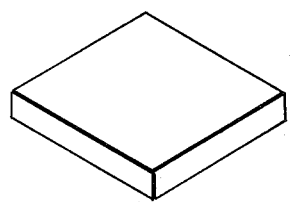
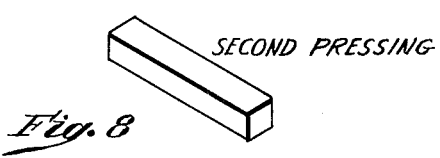

Aug. 29, 1961 A. W. DUNHAM ET AL 2,997,942
BALING APPARATUS
Filed April 26, 1957 5 Sheets-Sheet 5
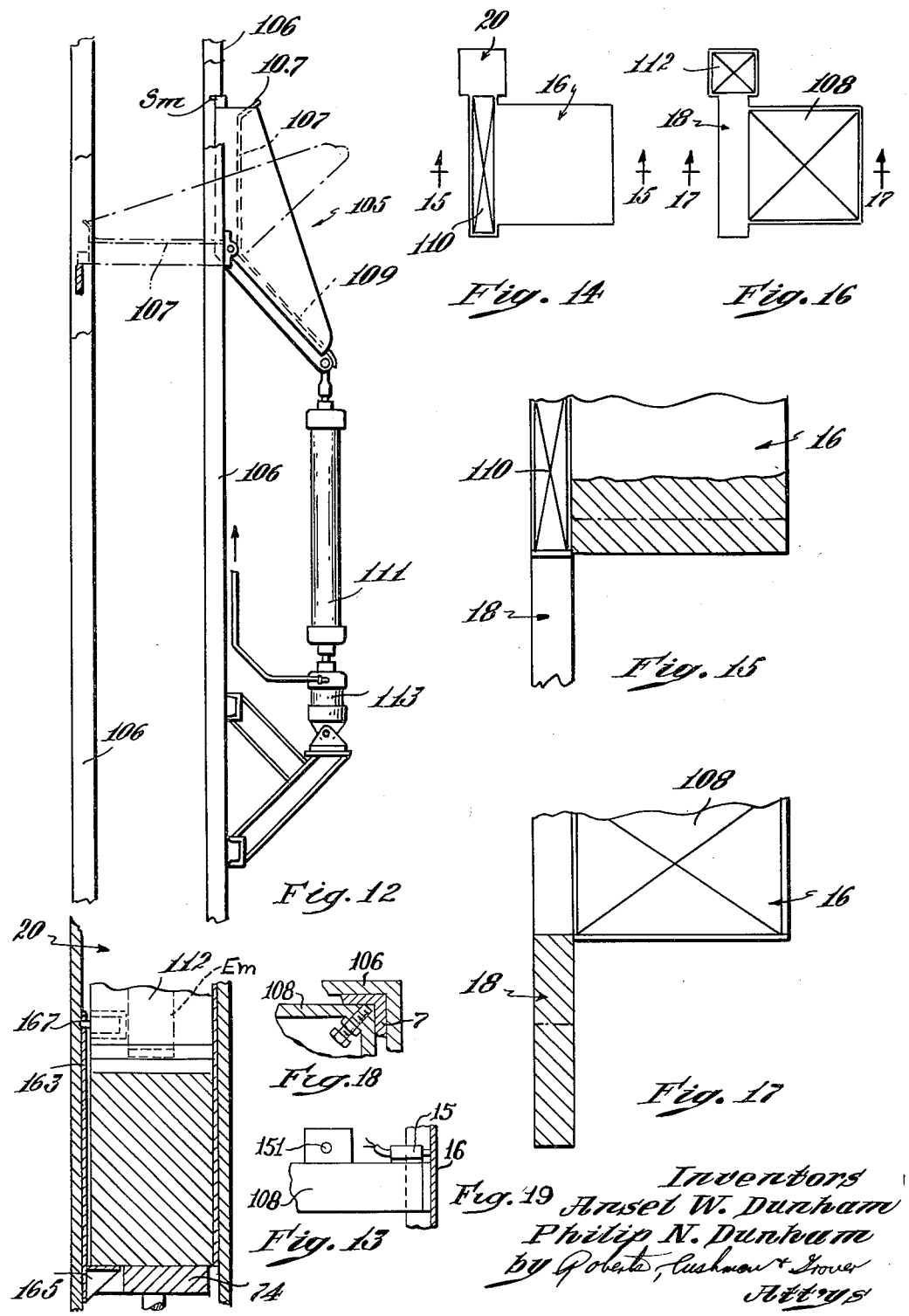
Inventors
Ansel W. Dunham
Philip N. Dunham
by Roberts, Cushman & Grover
Attys

United States Patent Office 2,997,942
Patented Aug. 29, 1961

2,997,942
BALING APPARATUS
Ansel W. Dunham and Philip N. Dunham, both of 9 Taft St., Nashua, N.H.
Filed Apr. 26, 1957, Ser. No. 655,432
34 Claims. (Cl. 100—42)

This invention relates to apparatus for baling metal and more especially to crushing and compacting scrap metal.

Vast amounts of scrap metal from manufacturing, and junk metal from automobile bodies, refrigerators, washing machines and the like household appliances, are consigned to junk yards each year and such material constitutes a valuable source of recoverable metal. Much of this metal is lost however due to the fact that to be useful it must first be pressed into dense compacts and to the fact that the only available equipment for compacting the scrap is extremely expensive so that comparatively few dealers in junk can afford to install such equipment. Moreover, the cost of shipping the uncompacted junk to the relatively few dealers who have this equipment is uneconomical because of its bulk.

The principal objects of this invention are to provide an apparatus for crushing and compacting scrap metal, wherever it is accumulated in any quantity, which is effective and yet inexpensive enough to be availed of by the average junk dealer, which being of a vertical nature requires much less area for its installation than apparatus heretofore employed, thereby making more of the yard available for storage purposes which is an important consideration in crowded areas and which requires much less power for its operation than available apparatus and thus reduces the cost of compacting the metal per pound, thereby increasing its value. Other objects are to provide apparatus for compacting the scrap in several stages so as to work the metal and to provide for adding scrap at an intermediate stage if desired; to provide apparatus in which the several stages of compacting may function simultaneously or successively; and to provide an apparatus which will discharge the completely compacted scrap at a level suitable for loading directly into railway cars or trucks, thereby to avoid rehandling. Still another object is to provide an apparatus with self-loading tackle which can reach scrap piled about it in the yard so as to eliminate the need for independent cranes or other lifting tackle.

As herein illustrated, the baling apparatus comprises a deep pit sunk into the ground which is suitably walled with concrete and lined with steel plates, at least some of which are removable for replacement due to wear. The pit has three chambers of successively increasing depth and different cross-sectional areas within which scrap is compacted by drop weights which are arranged to be dropped into the respective chambers to crush the scrap therein. Scrap crushed in the first chamber is transferred to the second for recompacting in a different direction to reduce its dimension in the direction of the applied force and increase its dimension transversely thereof, and from the second into the third for final compacting in still a third direction, which again reduces its dimension in the direction of applied force but increases its dimension transversely thereof. There is means for transferring the compacted metal from one chamber to the next and for removing the finally compacted compact from the third chamber. The chambers are connected and in one form of the invention there is a closure therebetween. Transfer is accomplished by raising the closure located between the several chambers and lifting the compacted metal in each chamber upwardly on an incline toward the opening in the next chamber so that it slides by gravity into the next chamber. The closure may be omitted however to advantage in operation by employing the weight in the second chamber as a closure while compacting the metal in the first and third chambers and by employing the weights in the first and third chambers while compacting the metal in the second chamber. Power operated transfer sections are located at the bottoms of the several chambers for transferring the compacts from one chamber to the next. The chambers are arranged so that the second chamber is somewhat larger in cross-section than the heightwise cross-section of the metal after compaction in the first chamber, whereby the compacted metal when lifted slides on edge into the second chamber. The third chamber likewise is somewhat larger in cross-section than the vertical cross-section of the metal compacted in the second chamber so that when the compact is raised in the second chamber it slides easily into the third chamber on end. The weights for the respective chambers are supported by a tower erected above the pit which has tracks for guiding the fall of the weights. Adjustable bearing plates carried by the weights and engaged with the track provide for taking up wear. Power operated means of suitable kind is provided to elevate and drop the weights. There is also means for elevating the closure when it is used. The third weight has associated with it means for lifting the finally compacted metal from the third chamber as the latter is elevated. There is a combination gate, weighing device and chute located in one or more of the walls of the tower shaft above the third chamber which is operated at a suitable time as the compact is lifted therein, to weigh the compact and discharge it onto a freight car or truck, or if desired to a conveyor for stock piling. At the top of the tower there is a crane mounted for turning about the vertical axis of the tower which is provided with a boom and tackle for transferring scrap piled in the yard about the tower onto or into a loading ramp or ramps at the base of the tower adjacent the first chamber. The loading platform may be tilted by power or by gravity alone to slide scrap piled thereon into the first chamber. There may be a second loading platform at the mouth of the second chamber and means for actuating it to add scrap to the second chamber when desired.

The inveniton will now be described in greater detail with reference to the accompanying drawings wherein:

FIG. 1 is an elevation of the apparatus partly in section, as seen from one side, with a portion of the tower broken away to shorten it for the purpose of illustration;

FIG. 2 is an elevation partly in section and broken away in part as seen from the left-hand side of FIG. 1;

FIG. 3 is a horizontal section taken on the line 3—3 of FIG. 2, with a plan view of the pulleys superposed thereon to show their disposition relative to the chambers;

FIG. 3a is a horizontal section taken on the line 3a—3a of FIG. 2;

FIG. 4 is a perspective view of the pit chamber structure removed from the ground showing the relation of the several chambers;

FIG. 5 is a perspective view of the closure means for the pit chambers;

FIG. 6 is a diagrammatic elevation to much smaller scale showing the power operated means for elevating the weights;

FIGS. 7, 8 and 9 show the several steps in crushing the scrap to final shape;

FIG. 12 is an enlarged view of the combination gate and chute;

FIG. 13 is a view to larger scale of the third shaft of the tower and the pit therebelow showing in the pit an alternate form of bale lifter and in the shaft the combination gate, weighing means and chute;

FIG. 14 is a diagrammatic plan view to smaller scale of the pit box with the closure omitted and the second weight shown in the second chamber blocking the openings to the first and third chambers;

FIG. 15 is a fragmentary section taken on the line 15—15 of FIG. 14;

FIG. 16 is a diagrammatic plan view to smaller scale of the pit box with the closure omitted and with weights in the first and third chambers blocking the openings to the second chamber;

FIG. 17 is a fragmentary section taken on the line 17—17 of FIG. 16;

FIG. 18 is a horizontal section through one of the vertical tracks, showing an adjustable wear plate; and FIG. 19 is a fragmentary vertical section within one of the chambers showing signal operating means carried by the weight and cooperable with a recess in the wall to indicate the level of the weight.

Figure 10:
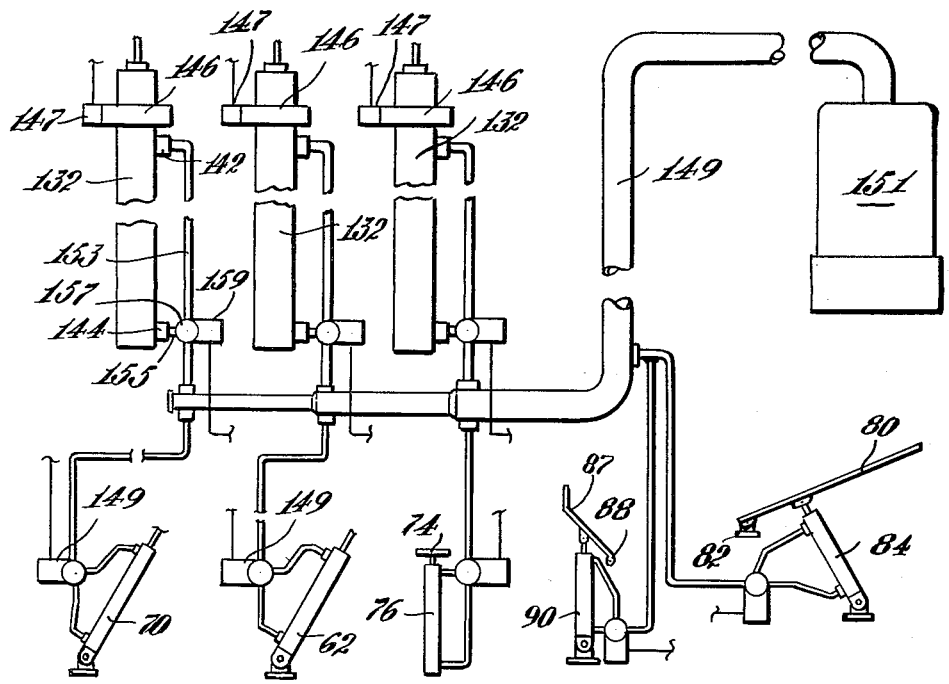
FIG. 10 is a diagrammatic layout of the power cylinders for the various parts.

Referring to the drawings, FIGS. 1 and 2, the baling apparatus comprises a pit 10 and tower 12 erected above it, the pit being adapted to receive a quantity of scrap metal and the tower being adapted to support drop weights which may be dropped onto the metal at the bottom of the pit for crushing and condensing the same.

At the bottom of the pit, which is sunk into the ground to a depth of about 36 feet, there is a pit box 14 (FIG. 4) comprising three chambers 16, 18 and 20. The chamber 16 is square in horizontal section and has a flat bottom 22 and perpendicular walls 24. The chamber 18 is of oblong cross-section and has a bottom 26 parallel to and below the bottom 22 of the chamber 16 and perpendicular walls 28 and 30. The wall 28 is somewhat wider than the wall 24 of the first chamber and the wall 30 is somewhat wider than the heightwise thickness of the scrap after it is compacted in the first chamber. Thus the cross-section of the chamber 18 is larger than the vertical cross-section of the metal compacted in the first chamber. The depth of the chamber 18, that is, from top to bottom, is at least as great as the height of the walls of the first chamber and preferably somewhat greater so that when a compact produced in the first chamber is transferred to the second chamber it will rest therein on one edge with all or a portion of it below the bottom of the first chamber. The third chamber 20 is of approximately square cross-section and has a bottom 32 parallel to and below the bottom 26 of the second chamber and perpendicular walls 34. The walls 34 are wider than the wall 30 of the second chamber so that it has a cross-section which is greater than the vertical cross-section of the compact formed in the second chamber. The depth of the chamber from top to bottom is at least equal to the height of the wall 28 in the second chamber and preferably greater so that when the metal compacted in the second chamber is transferred to the third so as to rest on one end therein all or a portion of it is below the bottom of the second chamber. By way of example only and in no sense limiting, the first chamber is 7½ feet on a side, the second chamber is 8 feet on its long side and approximately 18 inches on its short side, and the third chamber is 20–24 inches on a side. Using these dimensions the first charge of scrap is crushed into a square compact (FIG. 7) 7½ feet on the sides and 14–16 inches thick, the first compact is then repressed to a bar (FIG. 8) 8 feet long and 18 inches on the sides, and finally the bar is repressed to a compact (FIG. 9) 28–40 inches long and 20–24 inches on a side. The pit chambers are lined as illustrated in FIG. 3, the lining however having been omitted from FIG. 4 for the purposes of simplicity in making the perspective.

As shown, the first chamber 16 opens into the second chamber 18 and the second chamber 18 opens into the third chamber 20. According to one mode of operation a dividing closure 36 (FIG. 5) is provided for closing the several chambers from each other during the compacting operation, which closure may be elevated after compacting to permit the compact to be transferred from one chamber to the next so as to effect successive compacting operations. The closure (FIG. 5) has a wall 38 which spans the open side of the first chamber and a wall 40 which spans the open side of the second chamber. One edge of the wall 38 is slidable in a way 42 and the opposite edges of the wall 40 are slidable in ways 46—46. The walls 38 and 40 are welded together and mutually support each other against pressure exerted by the metal during compaction.

The apparatus may and preferably is simplified by omitting the closure 36 and using in lieu thereof the several weights for blocking off one chamber from another (FIGS. 14 to 17). The weights, as will appear hereinafter, are in the form of box-like structures adapted to fit closely into the chambers and loaded at their bottom sides. Hence by lowering the weight 110 in the second chamber (FIGS. 14 and 15) the open sides of the first and third chambers 16 and 20 may be closed so that scrap may be compacted in each of these chambers. After compaction in the first and third chambers, the weight in the second chamber may be elevated and the weights 108 and 112 in the first and third chambers 16 and 20 lowered to block the open sides of the second chamber 18, whereupon the metal in the second chamber may then be compacted. By employing this mode of operation the closure and the mechanism for elevating it may be omitted with an accompanying economy in manufacture and in operating cost.

A suggested mode of operation when the weights are employed in lieu of a closure is as follows: With a finished bale on the way to the discharge chute lift the weight in chamber 16 to the top of the tower. Lift weight in chamber 18 approximately 14 feet and hold it and then transfer the compact pressed in chamber 2 to chamber 3. Transfer the compact pressed in chamber 16 from chamber 16 to chamber 18. Lower the weight in chamber 18 so that it rests on the top of the compact in chamber 18. Lower the weight in chamber 20 so that it rests on the top of the compact in chamber 20. Now load chamber 16 and press the material in chamber 16 by dropping the weight therein. Following this compress in chamber 18 and then in chamber 20. The finished bale in chamber 20 may then be elevated for discharge. By following the above sequence of operation a saving in time may be realized and the several events are susceptible of automation.

The entire pit box 14 is made up of steel plate, for example, 1 inch plate welded or otherwise fastened securely together to form a rigid and unyielding structure and after being suitably positioned at the bottom of the hole sunk in the ground, concrete 56 is poured about it as shown in FIGS. 1 and 2. A wall thickness of about 18 inches or more of reinforced concrete is desirable and the concrete wall should be back-filled with the earth firmly tamped into place. Suitable alloy steel may be employed to withstand shock and wear which will be encountered.

The bottom 22 of chamber 16 has in it a movable elevator section 58 (FIG. 2) pivoted on a horizontal axis 60 parallel to the open side of the chamber so as to be swingable from a position flush with the bottom to an upwardly inclined position, as shown in FIG. 2. The elevator section is raised by a power operated cylinder 62, the latter being located in a narrow pocket 64 in the concrete below the chamber 16. At the bottom of the pocket there is a drainpipe 65 for drawing off water which may gain access to the chamber. The elevator section 58 provides for lifting the compacted metal from the first chamber so as to tilt it upwardly on one edge in a direction inclined toward the second chamber 18. Hence when the closure 36 is elevated, or the weight if the latter is employed rather than the closure, the compact will slide into the second chamber so as to rest on edge therein.

The second chamber 18 is also provided with an elevator section 66 (FIG. 1) which is pivoted on an axis 68 parallel to the opening between it and the chamber 20. The elevator section is provided with a power operated cylinder 70 located in the narrow pocket 72, below the chamber 18, formed in the concrete and this is also provided with a drain pipe 73. The elevator section 66 when raised tilts the compact pressed in the second chamber on end so as to slide into the third chamber 20 when the closure or weight therein is lifted. The third chamber has at its bottom an elevator section 74 in the form of a plate which may be raised vertically within the chamber and this section is lifted by a power operated cylinder 76 (FIG. 2) located in a large pocket 78 beneath the chamber 18. The drain pipes at the bottom of the first and second pockets are connected to the bottom of the third and there is provided in the third pocket a centrally located sump pump 79 for pumping water which accumulates in the apparatus to the surface.

Debris in the form of small stones, glass and the like collects at the bottom of the several chambers and must be removed. This is accomplished with a high pressure air hose handled by an operator who descends into the chambers and sweeps the debris from the floors with the air stream, from the first chamber into the second chamber and from the second chamber into the third chamber and from thence into the pocket 78 at the bottom of the third chamber. This pocket is provided with a basket 81 for receiving the debris which is removable through a lateral passage, not shown, so that it may be emptied when necessary.

The concrete backing for the pit extends from the pit box upwardly to the level of the ground. At the top of the pit adjacent one or both sides of pit 1 there is placed a loader platform or ramp 80 (FIG. 2), which is in the form of a flat steel plate pivoted to tilt about an axis 82 parallel to one side of the pit so that it may be elevated from a slightly inclined position upwardly to a steep incline, or be a stationary ramp of sufficient incline to cause the scrap placed thereon to slide into the pit. A power cylinder 84 is provided for raising the plate if used and is contained in a pocket 86 beneath the plate which may be a part of the concrete backing.

A weighing device may be incorporated in the loading ramp so that the operator can determine when a sufficient amount of metal is stacked thereon for charging into the first chamber.

It may be desirable to add metal to the compact produced in the first chamber after it is transferred to the second chamber or it may be desirable to place the scrap in the second chamber without first compacting it in the first chamber. Accordingly, there is a second loading platform 87 (Fig. 2) arranged at one side of the second chamber so as to pivot about an axis 88 parallel to that side and so as to be elevated by a power cylinder 90, or an inclined ramp as set forth above, to slide scrap placed upon its surface into this chamber.

It is to be noted that because of the arrangement of the several chambers it is possible to place the loading platform for the first chamber in either one or both of two different positions and this together with the loading platform for the second chamber is especially useful since it makes it possible to provide for the most efficient operation of the yard.

The tower 12 is comprised of structural steel in the form of angles and/or other suitable members which extend upwardly from the top of the pit box to the level of the ground and from thence upwardly to somewhat above 40 feet, so as to provide for a clear drop of approximately 40 feet to ground level which is about twice the distance above the ground that the bottom of the pit box is below the ground. The angle beams are joined at suitable vertically spaced intervals by cross-braces 94 and angle braces 96 to form a skeletal structure, at the top of which there is mounted a platform 98. As thus constructed the tower has three vertically disposed shafts 100, 102 and 104 (FIG. 3a), located vertically above the several pit chambers 16, 18 and 20. The angle beams 92 act as support or mounting members for vertical track members 106 at the four corners of each of the shafts and within which vertically slidable weights 108, 110 and 112 move respectively. To take up for wear adjustment slide plates 7 (FIG. 18) are mounted on the four corners of the weights for slidably engaging the tracks 106. The weights for the first and second chambers are fabricated of structural steel and have fastened to their lower or bottom sides heavy steel face plates. The weights are loaded so that the proper crushing pressure will be applied as it strikes the metal within the chamber below it to reduce the scrap to the thickness desired. Preferably the vertical depth of each weight approximates not less than twice the longest horizontal dimension thereof, so as to provide a long bearing surface between the weight and its tracks which will minimize any tendency for the face plate to tilt on impact due to an unequal resistance in the mass to be crushed. The weight for the third chamber is a solid block of lead or other suitable metal encased in a steel shell and has a heavy steel plate fastened to its bottom side. This weight may have housed within it behind or in its face plate a strong electromagnet for reasons which will appear hereinafter. The face plates of the several weights correspond in cross-section to the respective chambers.

Most of the forces produced by the weights falling on the scrap are concentrated within the pit chambers during the last part of the crushing operation where all four walls are backed by concrete; however, a considerable amount of wear takes place above the pit chambers and accordingly wear plates or liners (not shown) may be fastened to the concrete wall between the angle beams so as to cover the area between the top of the pit box and the level of the ground. Preferably the plates are fastened so that they may be removed and replaced when required. One-fourth to one-half inch steel plates suffice for this purpose. Removable wear plates (not shown) also also provided within the pit box.

The weight 108 is suspended in its shaft on one end of a cable 126 which passes over a pair of pulleys mounted on the tower. The weight 110 is fastened to one end of a cable 128 which passes over a second pair of pulleys and the weight 112 is fastened to one end of a cable 124 which passes over a third pair of pulleys. Each of the cables is connected to a power operated cylinder 132 (FIGS. 3 and 6), situated in a lined well 134 at the base of the tower. The well 134 is approximately 25–30 feet deep and each of the cylinders 132 located therein is of similar construction and contains a piston and rod 136 and 138 which is adapted to have a stroke of about 20–30 feet. The upper protruding end of each rod has on it a sheave 140 and since the connection between each weight and each cylinder is identical the several weights are illustrated in FIG. 6 by the reference character W, the tower supported pairs of pulleys by reference characters $P^1$ and $P^2$, and the cables by the reference character $c$. As will be seen each cable extends from the weight attached thereto over the pulleys $P^1$ and $P^2$, from thence upwardly to a fixed point F on the tower. Since the cable is doubled on itself between the pulley $P^2$ and the fixed point F a stroke of 20 feet for the piston rod will produce a lift of 40 feet for the weight W. The several cylinders 132 are provided with inlets 142 and 144 (FIG. 10), through which steam or other pressure fluid may be supplied to the piston. When steam or other pressure medium is supplied to the upper inlet 142 the piston is lowered so as to raise the weight and hold it in elevation. A safety lock mechanism (not shown) is provided near the top of each shaft to hold the weight at its topmost position until released. When a weight is to be dropped the sleeve valve 146 at the top of the steam cylinder is mechanically rotated to uncover a number of exhaust ports simultaneously, thereby permitting the weight to be dropped freely to the bottom of the chamber. Since the piston rod is quite long it represents a substantial weight and would tend to counterbalance the weight and hence retard its free fall. Accordingly, if found desirable, at the same time that the valve 146 is opened pressure may be supplied through the lower inlet 144 to the bottom side of the piston so as to push it upwardly and thus eliminate drag on the weight. The cylinder 132 is extended appreciably beyond the valve 146 so that as the piston rises to the top it passes over the exhaust opening and traps air or steam in the upper end so as to cushion its upward movement and bring it to a stop without knocking the top out of the cylinder.

The well 134 in which the cylinders are disposed may be covered at the top and provide a muffler for deadening the sound of the exhaust from the cylinders. By exhausting the steam into the well the cylinders are kept warm which increases their efficiency and permits economical use of superheated steam. If desired the well 134 may be heavily insulated and be employed as an accumulator to the end that a smaller boiler may be used, which can between cycles discharge its steam into the accumulator for peak withdrawal at the time needed.

Part way up the tower on one side there is mounted a control booth 148 (FIG. 1), within which are suitable controls for supplying steam to the several cylinders, operating the valves to exhaust the cylinders to permit the weights to drop and operating means for raising the closure 36, if the latter is employed, between successive compacting operations and for transferring the compacts from one chamber to another. Such means may be remotely controlled by pressure operated means or electrically operated means as is found to be most convenient. Purely schematically and not intended to be restrictive in any way the several operating cylinders 132 may be connected to a steam line 149 (FIG. 10) which in turn is connected to a boiler 151. Each cylinder is connected to the line 149 by conductors 153 and 155 which have a two-way valve 157, which in one position admits steam to one end of the cylinder and in the other position to the opposite end of the cylinder. The valve also has exhaust ports to permit escape of steam from the respective ends of the cylinders when steam is applied to the opposite ends. A rotary solenoid 159 may be employed for actuating the valve 157 and this is desirable because it enables controlling the valves from a master panel 161 (FIG. 11) located in the booth 148. The exhaust valves 146 are in turn operated by solenoids 147 and the latter by control buttons for each valve which are arranged on the panel 161 so that when an exhaust valve 147 is opened a steam valve 157 is turned to a position to admit steam to the bottom of the cylinder and when the exhaust valve is closed steam is admitted to the top of the cylinder. The arrangement is preferably such that the exhaust valve and steam valve may be operated independently.

Since the weights must be elevated to the top of the tower after each crushing operation means may be provided for raising the closure means 36 at the same time if the latter is employed. For example, the weights 103 or 112 may be provided with electromagnetically operated latch bolts 151, FIG. 19, for engagement with openings 152 (FIG. 5) of the closure 36 so that when the weights are raised the closure is also raised. Preferably the latch bolts are electrically operated to engage and release the closure at the proper time and to be actuated from the control booth 148. The first and second pressings are transferred from the first and second chambers to the second and third chambers by the elevators which in turn are operated by the cylinders 62 and 70 to which steam is admitted by solenoid control valves 149 in FIG. 10.

In order to lift the finished pressing from the third chamber after it is dislodged by the elevator 74 and cylinder 76 the electromagnet $Em$ in the face of the third weight is energized to hold the compact thereagainst. Hence as the weight is lifted the compact is also lifted.

A second device for lifting the finished bale is shown in FIG. 13, in the form of a vertically slidable lifting member 163 set into a groove at one side of the third chamber. The lifting member is provided with a foot 165 set flush with the floor of the third chamber and thus lies beneath the bale as it is compacted in the third chamber. A portion of the member extends upwardly above the bale and has a hole in it through which a solenoid control latch 167 carried by the weight may be projected, thereby to lock the slide to the weight, so that when the latter is lifted it will at the same time raise the bale upwardly into the shaft.

To ease dislodgement of the compact from the pit chamber 20 its walls may be made to diverge slightly from the bottom upwardly for the first few feet. The walls of pit chambers 16 and 18 may also diverge slightly toward their open sides if desired.

Part way up the tower 12 (FIG. 12) there is a device 105 which is a combination gate, scale and discharge chute. This device has angularly disposed sides 107 and 109 and is mounted on the tower opposite a gap in the tracks 106 so that it may be moved from a position in which the side 107 is perpendicular and in which position it fills the gap in the tracks so that the latter are continuous, to a position in which the side 107 extends inwardly, horizontally cross the third shaft. When the side 107 occupies its vertical position the side 109 inclines outwardly and downwardly and this side is connected to a piston 111. By supplying pressure to the piston the side 107 may be rocked inwardly, as shown in dotted lines, so as to extend across the shaft to receive a bale which is to be ejected. The side 107 has a rolled back edge 10.7 designed to center the bale so that weighing will be accurate. A weighing unit 113 is connected to the lower end of the piston 111 and is operable when the bale is dropped onto the side 107 to weigh the bale and register its weight in the control housing on suitable means, such for example as a tape. To this end a microswitch SM is actuated as the side 107 contacts the tower frame to feed a length of tape forward with reference to registering mechanism in the control tower. After the bale is deposited on the side 107 the device is rocked outwardly to discharge the bale and the side 109 provides an inclined chute for directing the fall of the bale outwardly toward a truck or the like. As the side 107 rises the full weight of the bale is supported by the cylinder 113 connected to the lower end of the pressure cylinder 111 which transmits pressure through an oil line to a pressure gauge in the control cab, the gauge being calibrated to register in pounds and being provided with means for printing the weight on the tape as the sum of the accumulated weights. By rocking the device at different rates the bale may be ejected different distances, thereby permitting distribution of the bales on a truck bottom in reasonably uniform layers.

At the top of the tower on the platform 98 (FIG. 2) there is mounted a crane carriage 154 for rotation through 360°. The crane is provided with a boom 156 and suitable power operated mechanism including a motor $M^1$ for extending and retracting the boom and for letting out and retrieving a cable 158 to the lower end of which is fixed tackle, grappling means or a magnet 160, by means of which scrap piled in the yard about the tower may be picked up and swung into a position above the loading platform 80 or 87 for deposit therein.

In the operation of the apparatus the crane operator by suitable manipulation of the boom 156 and tackle picks up scrap, for example, an automobile body filled with smaller scrap metal and deposits it on the loading platform 80. The operator in the control booth 148 then manipulates buttons or valves from the master control panel 161 to raise the loading platform 80 or safety gate (not shown), and thereby causes the material to slide into the pit and drop to the bottom of the first chamber. With the closure 36 in its down position and the weights all at the top of the tower, the tower operator then opens the valve 146 on the cylinder 132 controlling the weight 108, thereby releasing it and allowing it to drop under its own weight to the bottom of the pit chamber 16. The impact produced by the falling weight crushes the body to a vertical thickness of approximately 14–16 inches. The cross-sectional dimensions of the first pressing is at this point 7½ feet by 7½ feet. It may be necessary to drop the weight 108 several times before producing the thickness wanted and it may be necessary to add scrap to build up the pressing to the desired thickness. A signal device (FIG. 19) may be employed to indicate when the charge is compacted the right amount. Thus each weight has mounted on it a switch 15 which has a plunger arranged to enter a depression in the wall of the chamber when the weight reaches a predetermined level. At this level the switch closes to complete a circuit which in turn operates a visible or audible signal. After the mass has been crushed to the desired thickness in the first chamber, as indicated by the signal in the control cab, the weight 108 is raised and the closure 36 is raised so as to open the chamber 16 to the chamber 18. The section 58 is lifted upwardly at an angle thus to raise and tilt the first pressing in the chamber 16 on edge and drop it on edge into the second chamber 18. The closure 36 is now dropped down to its closed position and a new batch of scrap is loaded into the first chamber, whereupon the weights 108 and 110 are dropped into the first and second of said chambers 16 and 18 to crush the new load of scrap and to repress the first pressing formed in the first chamber by applying pressure to an edge of it at right angle to the direction of the first application of pressure thereto. The weights 108—110 are now raised, the closure 36 is raised, the elevators 56 and 58 are raised to transfer the pressings from the chambers 16 and 18 to chambers 18 and 20, whereupon the closure is again lowered and another fresh batch of scrap is dumped into the chamber 16. Now all three weights are dropped independently or simultaneously so as to crush the new charge to repress the pressing in the second chamber on an edge and to repress the pressing in the third on an end. Pressing of the compact in the second chamber reduces it to a bar having a cross-section of about 18 inches on each side and 8 feet long and reduction of the compact in the third chamber shortens its length to about 28–40 inches. When the compact in chamber 20 has been crushed to its final dimensions again as indicated in the operator's cab, and the weights and closure lifted, the compact in chamber 20 is raised upwardly to the level of the pit and into the tower to the gate which is then operated to weigh the bale and tip it down the chute 109 into a railway car, truck or suitable conveyor. The operation may be continuous in that there is always a new charge being operated upon as the second and third charges are being completed. Thus it is possible to have high production in a very small area and with a minimum of expenditure of power.

As previously explained, if the closure is omitted the weights in the several chambers may be employed to block the chambers one from another during compacting. The use of the weights themselves for separating the chambers during compacting has the advantage of eliminating an added element which is costly both from the standpoint of manufacture and operation.

Figure 11:
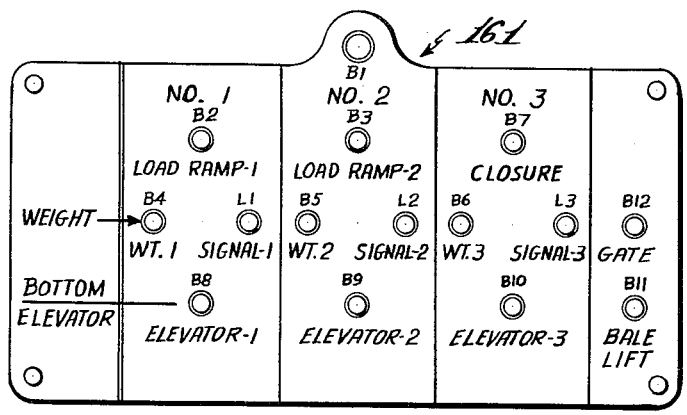
FIG. 11 is a plan view of a central panel.

FIG. 11 shows a control panel with a plurality of push buttons on it which close appropriate electric circuits for carrying out the several operations. At the top of the panel there is a master control button $B^1$ which will initiate operation of a typical cycle, to wit, elevating the charging ramp so as to drop scrap into the first chamber, dropping the closure into place or the second weight as the case may be, dropping the first weight one or more times until the signal shows that the scrap has been compacted to the proper thickness, transferring the compact to the second chamber, compacting it in the second chamber, transferring it to the third chamber, compacting it in the third chamber and finally lifting it out of the third chamber and discharging it. It is desirable to have additional buttons for controlling the several operations independently; accordingly, there is provided on the control panel buttons $B^2$ and $B^3$ for operating the loading ramps, $B^4$, $B^5$ and $B^6$ for controlling the weights, $B^7$ for controlling the closure, $B^8$, $B^9$ and $B^{10}$ for raising the elevator sections at the bottoms of the respective chamber, $B^{11}$ for controlling the electromagnetic lift or mechanical lift as the case may be, and $B^{12}$ for controlling the gate, weighing means and discharge means. Signal lights $L^1$, $L^2$ and $L^3$ are indicated on the panel.

In some kinds of scrap it may not be necessary to have a first pressing in the chamber 16 and so the second chamber is provided with a charging platform 87, by means of which scrap may be loaded directly thereinto for receiving a first pressing in the second chamber and then a final pressing in the third chamber.

The power provided for operating such apparatus found to be most economical to date is steam, however, it is possible to use electric power or other means if desired. In any event a considerable saving is accomplished by utilizing the impact of a falling weight employing gravity to full advantage, for applying pressure and very much denser pressing is possible with a given amount of horsepower than with straight pressing operations such as provided with the fluid pressure systems now in use. A very important advantage of the apparatus is that it takes up a compratively small area for installation hence leaving the major part of the yard available for stock piling the scrap preparatory to pressing or thereafter.

It should be understood that the present disclosure is for the purpose of illustration only and that this invention includes all modifications and equivalents which fall within the scope of the appended claims.

We claim.

1. Baling apparatus comprising a pit having three chambers, each having an open top and a closed horizontally disposed bottom, said chambers being of successively smaller volume and lower level, one wall of each chamber being common to one of the other chambers, said walls of each chamber which are common to one of the other chambers constituting closures between chambers, and means for opening the closures to permit gravitationally discharging the mass compacted in each chamber to the next smaller chamber.

2. Baling apparatus comprising a pit having a deep open top chamber of square cross-section, a second open top chamber at one end of the first chamber of oblong cross-section and a third open top chamber at one end of the second chamber of square cross-section, said second and third chambers having bottoms of successively lower levels than the first chamber, and said tops all lying in a common horizontal plane, and a door dividing the chambers one from the other, said door being movable in elevation from the bottoms of the first and second chambers to provide progressive movement of the contents in process from the first chamber to the second chamber and from the second chamber to the third.

3. Baling apparatus comprising a pit having a first open top chamber of square cross-section and a suitable depth to receive a quantity of scrap, a second open top chamber of oblong cross-section next to one side of the first chamber of suitable depth to receive the scrap compacted to the shape of the cross-section of the first chamber on an edge, said second chamber having a bottom below that of the first chamber, and a third open top chamber of square cross-section next to one end of the second chamber of suitable depth to receive the scrap compacted to the shape of the second chamber on one end, said third chamber having a bottom below that of said second chamber, the open tops lying in a common horizontal plane, means at the bottom of the first and second chambers gravitationally to discharge the compacted mass from the first and second chambers respectively, into the second and third chambers and means at the bottom of the third chamber to facilitate elevation of the finished compact from the pit.

4. Baling apparatus comprising a pit having first, second and third open tops chambers of successively smaller volume, said first chamber being of a predetermined cross-section and depth for receiving uncompacted scrap, said second chamber having a cross-section, one dimension of which is greater than one cross-sectional dimension of the first chamber and the other of which is greater than the thickness to which the scrap is compacted in the first chamber, and a depth at least equal to the other cross-sectional dimension of the first chamber, the third chamber having a cross-section, one dimension of which is greater than one cross-sectional dimension of the second chamber and the other of which is greater than the thickness of the compact after it is pressed in the second chamber, and a depth at least equal to the other cross-section dimension of the second chamber, and means for applying pressure to the scrap in each of said chambers, perpendicular to the cross-sections of said chambers.

5. Baling apparatus according to claim 4, wherein the chambers are located at the bottom of a deep pit in the ground, the walls and bottom of the pit being backed by a substantial thickness of reinforced concrete.

6. Baling apparatus according to claim 4, wherein the chambers constitute a pit box which is embedded in concrete at the bottom of a deep pit, and wherein the walls of the pit above the pit box are lined with heavy gauge sheet steel.

7. Baling apparatus according to claim 5, wherein the chambers constitute a steel pit box at the bottom of a deep hole in the ground, the concrete backing encases the pit box and rises upwardly from its top to the level of the ground and steel wear plates are removably fastened to the concrete walls above the pit box.

8. Baling apparatus comprising a pit containing a pit box having first, second and third open top chambers, said chambers having horizontally disposed bottoms, said first chamber having a square cross-section of predetermined dimensions and being of suitable depth, to receive a quantity of loose scrap metal for compacting therein to a predetermined thickness, said second chamber having an oblong cross-section, one dimension of which is greater than one cross-section dimension of the first chamber, and the other of which is greater than the thickness of the mass compacted in the first chamber, and a depth at least as great as the other cross-sectional dimension of the first chamber, into which the compacted scrap metal from the first chamber may be placed on edge, said third chamber having a square cross-section, the sides of which are greater than the shorter cross-sectional dimension of the second chamber and a depth at least equal to the longer cross-sectional dimension of the second chamber, and pressure applying means operable in each of the chambers to compact the metal perpendicular to the bottoms.

9. Baling apparatus comprising a pit divided in horizontal section into three open top interconnected chambers of successively greater depth and smaller cross-section, the first of said chambers being adapted to receive a loose mass of scrap for compacting, means for loading the first chamber with a quantity of scrap, a driver arranged to be dropped into the chamber on top of the mass to compact it at the bottom thereof, means at the bottom of the first chamber for discharging the mass compacted therein into the second chamber on an edge, a driver arranged to be dropped into the second chamber against the opposite edge of the compact deposited therein, means at the bottom of the second chamber for discharging the mass compacted therein into the third chamber on one end, a driver arranged to be dropped into the third chamber against the opposite end of the compacted mass there, and means at the bottom of the third chamber to lift the finally compacted mass from the pit.

10. Baling apparatus comprising a pit divided in horizontal section into three open top interconnected chambers of successively greater depth and smaller cross-section, a super-structure above the pit, drop weights supported by the super-structure, means operable to release said drop weights for dropping them into the several chambers and re-elevating them for the next operation, means for loading a quantity of scrap into the first chamber, means for releasing the first weight to press the scrap against the bottom, means for transferring the crushed scrap from the first chamber into the second chamber and for reloading the first chamber, means for releasing the first and second weights to crush the scrap in the first and the mass in the second chamber, means for transferring the compacted mass from the first and second chambers to the second and third chambers and for reloading the first chamber, means for releasing all of the weights for crushing the scrap in the first chamber and repressing the masses in the second and third chambers and means in the third chamber for lifting the finally pressed compact from the pit.

11. Baling apparatus comprising a pit divided into three open top interconnected chambers of successively greater depth and smaller cross-section, closure means located between the first, second and third chambers, a super-structure above the pit, drop weights supported by the super-structure, one above each pit, means for releasing each weight and re-elevating for the next operation, means operable by the elevating means for raising the closure means between successive chambers, and other means operable by said elevating means to elevate the compact from the third chamber to a place of discharge at a predetermined height above the pit.

12. Baling apparatus comprising a pit divided into three open top interconnected chambers of successively greater depth and smaller cross-section, closure means forming one wall of the first and second chambers, and one wall of the second and third chambers, means for elevating the closure to provide access means between the chambers, elevating means at the bottoms of the first and second chambers operable to lift a mass resting on the bottom thereof upwardly at an angle inclined toward the open side of the next lower chamber, and elevating means in the third chamber operable to lift a mass at its bottom bodily upward for discharge from the pit.

13. Baling apparatus comprising a pit divided into three open top interconnected chambers of successively greater depth and smaller cross-section, closure means between the successive chambers, means for moving the closure means between chambers to afford communication between them, elevating means at the bottom of the several chambers, those in the first and second chambers being pivoted to swing upwardly from their bottoms about an axis parallel to the opening between those chambers and the next lower chamber and the one in the last chamber being operable to move bodily upward toward the top of the pit and power operable means for effecting operation of the elevators.

14. Baling apparatus comprising a pit divided into three open top interconnected chambers of successively greater depth and smaller cross-section, closure means between the successive chambers, means for loading scrap into the first and second of the chambers, means for compacting scrap in the respective chambers, means for raising the closure means successively as the scrap is compacted in the respective chambers, and means for transferring scrap compacted in the first and second chambers to the second and third chambers.

15. Baling apparatus comprising a pit divided into three open top interconnected chambers of successively greater depth and smaller cross-section, a tower above the pit, drop weights supported by the tower above the several chambers, means for releasing the weights so that they drop freely on adjustable tracks for guiding the weights when released into the respective chambers, means for re-elevating the weights after they have fallen and means for transferring the compacted mass successively from the first chamber to the last chamber as it is progressively reduced in size.

16. Baling apparatus comprising a pit divided into three open top interconnected chambers of successively greater depth and smaller cross-section, a tower above the pit, drop weights supported by the tower above the several chambers, means selectively operable to release the weights, adjustable tracks for guiding the weights into the respective chambers, means selectively operable for re-elevating the weights, closure means between the successive chambers through which the mass compacted in one chamber may be discharged into the next, means operable in conjunction with re-elevation of the weights to open the closure means between chambers and means operable to discharge the compacted mass from the first and second chambers into the second and third chambers and from the third chamber out of the pit.

17. Baling apparatus comprising a pit divided into three open top interconnected chambers of successively greater depth and smaller cross-section, a tower above the pit, drop weights supported on the tower above the several chambers, means selectively operable for releasing the weights and pressure operated means selectively operable for re-elevating the weights.

18. Baling apparatus comprising a pit divided into three open top interconnected chambers of successively greater depth and smaller cross-section, a tower above the pit, pulleys on the tower, cables running on the pulleys, weights suspended at the ends of the cables above the several chambers, power operated means connected to the opposite ends of the cables normally holding the weights elevated, and means for rendering the power operated means ineffective.

19. Baling apparatus comprising a pit divided into three open top interconnected chambers of successively greater depth and smaller cross-section, a tower above the pit, pulleys on the tower, cables running on the pulleys, weights suspended at the ends of the cables above the several chambers, power operated means connected to the opposite ends of the cables movable in one direction to elevate the weights and hold them elevated, and means for releasing the power operated means to permit the cables to run freely over the pulleys.

20. Baling apparatus comprising a pit divided into three open top interconnected chambers of successively greater depth and smaller cross-sectional area, a tower above the pit, pulleys on the tower, cables running on the pulleys, weights suspended at the ends of the cables above the several chambers, pistons and rods connected to the opposite ends of the cables, cylinders containing the pistons and rods operable to move the rods in directions to shorten the cables and hence to raise the weights, and means for exhausting the cylinders at the sides of the pistons from which the rods extend and to supply power to the opposite sides.

21. Baling apparatus comprising a pit divided into three open top interconnected chambers of successively greater depth and smaller cross-sectional area, a tower above the pit, said tower having quadrilaterally arranged tracks defining shafts, one above each chamber, a weight slidable within each shaft, adjustable plates at the corners of the weights slidably engaged with the tracks, power operated means including a cable connected to each weight for elevating it to the top of the tower and releasing it, and a face plate at the bottom of each weight having a cross-section corresponding to the cross-section of the chamber into which it is to be dropped.

22. Baling apparatus according to claim 21, wherein each weight has a vertical height in the order of twice the longest dimension of one side of its face plate.

23. Baling apparatus comprising a pit and tower above it, said tower supporting a vertical shaft, a weight supported near the top of the shaft for dropping into the pit therebeneath to crush a mass of scrap in the pit, means for releasing the weight, means for re-elevating the weight, means carried by the weight for lifting the mass from the pit part way up the shaft, there being a gap in a side of the shaft, a gate situated in the gap normally closing the same, means for tilting the gate to a position extending across the shaft after the bale has been lifted above it to receive the bale and means for tilting the gate outwardly to discharge the bale.

24. Baling apparatus comprising a pit and tower above it, said tower supporting a vertical shaft, a weight supported near the top of the shaft for dropping into the pit therebeneath to crush a mass of scrap in the pit, means for releasing the weight, means for re-elevating the weight, means operable to lift the mass from the pit part way up the shaft, there being a gap in the side of the shaft, means constituting a combination gate and ejector situated in the gap, said means in one position closing the gap and in another position extending across the shaft in a position to receive the bale, and means for tilting the combination gate and ejector from its gate performing function to its bale-receiving position and thereafter restoring it to its gate performing position for discharging the bale.

25. Baling apparatus comprising a pit and tower above it, said tower supporting a vertical shaft, a weight supported near the top of the shaft for dropping into the pit therebeneath to crush a mass of scrap in the pit, means for releasing the weight, means for re-elevating the weight, means operable to lift the mass from the pit part way up the shaft, means constituting a combination gate, scale and ejector situated in a gap in said shaft, said means being pivotally mounted on the tower and movable from a vertical position closing the gap to a horizontal position extending inwardly of the shaft, power operated means for rocking said means from one position to the other and back to receive the bale and discharge it, and means associated with the power operated means for weighing the bale while resting on said combination gate, scale and ejector when the gate occupies its horizontal position within the shaft.

26. Baling apparatus comprising a pit and tower above it, said tower supporting a vertical shaft, a weight supported near the top of the shaft for dropping into the pit therebeneath to crush a mass of scrap in the pit, means for releasing the weight, means for re-elevating the weight, means operable to lift the mass from the pit part way up the shaft, a gate pivotally mounted on the tower in a gap in said shaft, a slide fixed to the gate so as to project outwardly and downwardly therefrom, said slide being movable with the gate, power operated means connected to the slide operable to tilt the gate from its gap closing position inwardly across the shaft to a horizontal position for receiving a bale and for thereafter tilting it outwardly to cause the bale to descend the slide and a weighing device associated with the power operated means for weighing the bale when the gate is in its horizontal position.

27. Baling apparatus comprising a pit and tower above it, said tower supporting a vertical shaft, a weight supported near the top of the shaft for dropping into the pit therebeneath to crush a mass of scrap in the pit, means for releasing the weight, means for re-elevating the weight, means for lifting the mass from the pit part way up the shaft, there being a gap in the size of the shaft, a combination gate and chute situated in the gap with the gate normally closing the gap and the chute extending downwardly and outwardly therefrom, means for tilting the gate to a position extending across the shaft for receiving a bale and for thereafter restoring it to its gate closing position to discharge the bale over the chute, and means for controlling the angular position of the chute as it is tilted outwardly.

28. Baling apparatus comprising a pit having three interconnected chambers having open tops and horizontally disposed closed bottoms, said open tops permitting compacting forces in the several chambers to be applied in the same direction, said chambers being of successively small volume, there being an opening between the first and second chambers and the second and third chambers through which the charge pressed in the first chamber may be transferred to the second chamber for repressing and the charge in the second chamber may be transferred for repressing in the third chamber, and means operable in the same direction in the respective chambers for compacting the metal therein, the compacting means being selectively positionable to block the opening between certain of the chambers while compacting metal in other of the chambers.

29. Baling apparatus comprising a pit having three open top interconnected chambers of successively smaller volume, there being an opening between the first and second and the second and the third chambers through which metal compacted in the first chamber may be transferred for recompacting to the second and third chambers, means operative in each of the chambers to compact the metal therein, the means in the first and third chambers being positionable to close the openings between the first and second and the second and third chambers while metal is being compacted in the second chamber.

30. Baling apparatus comprising a pit having three open top interconnected chambers of successively smaller volume, there being an opening between the first and second and the second and the third chambers through which metal compacted in the first chamber may be transferred for recompacting to the second and third chambers, and means operable in each chamber to compact metal therein, the means in the second chamber being operable to close the openings between the first and second and the second chambers and third chambers while metal is being compacted in the first and third chambers.

31. A method of compacting scrap metal which comprises subjecting the metal to three compacting forces applied successively in three different directions at right angles to each other, to reduce the dimension of the compact in the direction of pressing and during the second and third compacting operations to increase the cross-section area perpendicular to the direction of pressing thereby to facilitate compacting in the direction of the applied compacting force.

32. A method according to the preceding claim wherein each pressing reduces the overall volume of the compact.

33. A method of compacting scrap metal which comprises compacting the loose scrap in a chamber of predetermined cross-section to a predetermined thickness in the direction of pressing, turning the partially compacted metal on an edge and repressing it in a second chamber of smaller volume at right angles to the first pressing to reduce it to a predetermined thickness in the direction of pressing and to increase its cross-section at right angles thereto, and finally turning the second pressing on an end in a third chamber of still smaller volume and repressing it therein to reduce it in the direction of pressing to a predetermined length and to increase its cross-section at right angles thereto.

34. Baling apparatus comprising a pit having three open top chambers of successively smaller volume with their bottoms at successively lower levels and their tops in a common horizontal plane, one wall in each chamber being common to one of the other chambers, and constituting a door between chambers, opening of which opens adjacent chambers to each other, and means for gravitationally discharging a comact mass resting at the bottom of a chamber of higher level to the chamber of next lower level.

References Cited in the file of this patent

UNITED STATES PATENTS

| 326,698 | Wilkinson | Sept. 22, 1885 |
| 737,427 | Lemberg | Aug. 25, 1903 |
| 920,106 | Beche | May 4, 1909 |
| 1,847,844 | McLaren | Mar. 1, 1932 |
| 2,675,718 | Finney | Apr. 20, 1954 |
| 2,748,694 | Thompson | June 5, 1956 |
| 2,780,989 | Guy | Feb. 12, 1957 |

FOREIGN PATENTS

| 218,745 | Great Britain | July 14, 1924 |
| 379,378 | Germany | Aug. 21, 1923 |
| 541,162 | France | Apr. 28, 1922 |